(12) United States Patent
Gaudig et al.

(10) Patent No.: US 8,480,151 B2
(45) Date of Patent: Jul. 9, 2013

(54) ACCOMMODATION UNIT FOR STORAGE COMPARTMENT AND STORAGE COMPARTMENT

(75) Inventors: Ralf Gaudig, Ruesselsheim (DE); Klaus Kuhlmann, Nauheim (DE); Werner Berhard, Nauheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 581 days.

(21) Appl. No.: 12/645,185

(22) Filed: Dec. 22, 2009

(65) Prior Publication Data

US 2010/0156132 A1    Jun. 24, 2010

(30) Foreign Application Priority Data

Dec. 22, 2008   (DE) .......................... 10 2008 064 460

(51) Int. Cl.
*B60R 7/04* (2006.01)
(52) U.S. Cl.
USPC ...................................... 296/37.8; 296/24.34
(58) Field of Classification Search
USPC .. 296/24.34, 37.8, 37.12; 224/483; 248/311.2
See application file for complete search history.

(56) References Cited

U.S. PATENT DOCUMENTS

| | | | | |
|---|---|---|---|---|
| 7,341,297 B2 * | 3/2008 | Nakamura et al. | ......... | 296/24.34 |
| 7,387,304 B1 * | 6/2008 | Rich et al. | ................. | 280/47.131 |
| 7,510,158 B1 * | 3/2009 | Terry et al. | .................... | 248/313 |
| 2006/0237611 A1 * | 10/2006 | Sturt et al. | ................. | 248/311.2 |
| 2006/0237612 A1 * | 10/2006 | Thomas | ..................... | 248/311.2 |
| 2008/0083857 A1 * | 4/2008 | Kato | ............................. | 248/149 |
| 2009/0095865 A1 * | 4/2009 | Everhart et al. | ............ | 248/309.1 |
| 2009/0115215 A1 | 5/2009 | Abro et al. | | |
| 2011/0074173 A1 * | 3/2011 | Gaudig et al. | ............. | 296/24.34 |
| 2012/0091744 A1 * | 4/2012 | McKnight et al. | ......... | 296/24.34 |

FOREIGN PATENT DOCUMENTS

| | | |
|---|---|---|
| DE | 19959895 A1 | 6/2001 |
| DE | 202004002992 U1 * | 8/2005 |
| DE | 102004011306 A1 | 9/2005 |
| DE | 202004011589 U1 | 12/2005 |
| DE | 102005017565 A1 | 12/2006 |
| DE | 102006021685 A1 | 11/2007 |
| EP | 1854672 A2 | 11/2007 |
| JP | 2008279891 A | 11/2008 |
| KR | 20040065913 A | 7/2004 |

OTHER PUBLICATIONS

Machine Translation of DE-202004002992-U1, printed from the EPO website, Oct. 16, 2012.*
British Patent Office, British Search Report for British Application No. 0921084.0, Mar. 16, 2010.

* cited by examiner

*Primary Examiner* — Jason S Morrow
(74) *Attorney, Agent, or Firm* — Ingrassia Fisher & Lorenz, P.C.

(57) ABSTRACT

A motor vehicle is provided having at least one storage compartment, a storage compartment having at least one accommodation unit, and an accommodation unit for a storage compartment of a motor vehicle, including a plurality of frame sections making up a frame, with which the frame may mounted so as to be movable in the storage compartment, wherein in a space defined by the frame at least one retaining element of variable shape and connected to at least two frame sections is arranged to extend between the frame sections in the defined space, forming at least one restraining area.

17 Claims, 3 Drawing Sheets

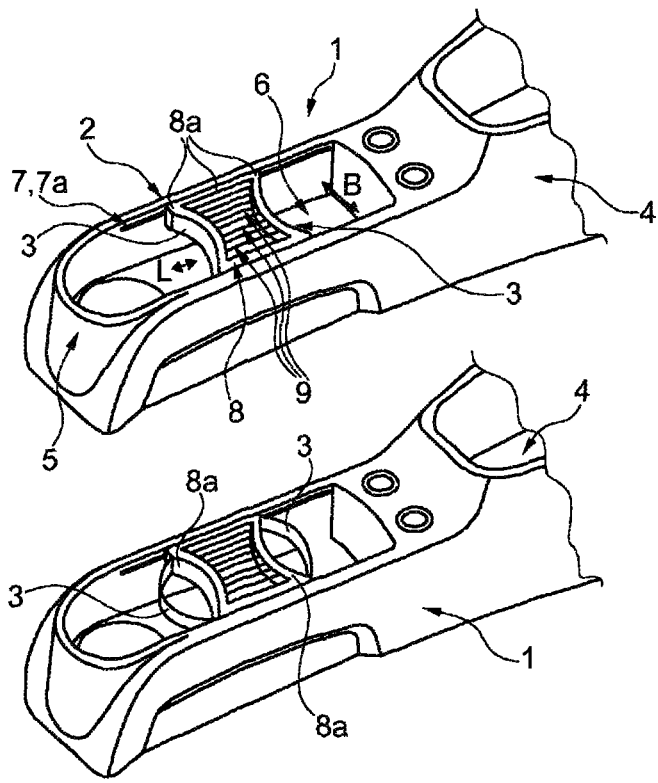
Fig. 1
Fig. 2
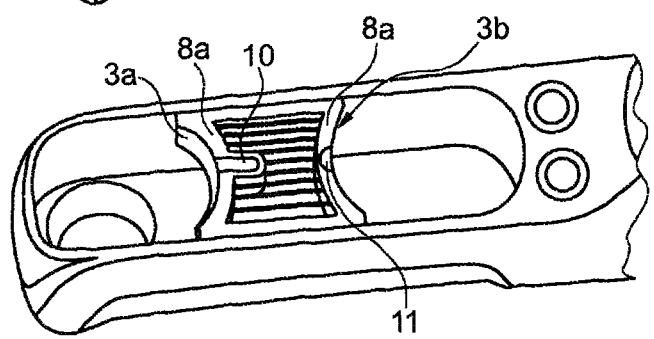
Fig. 3
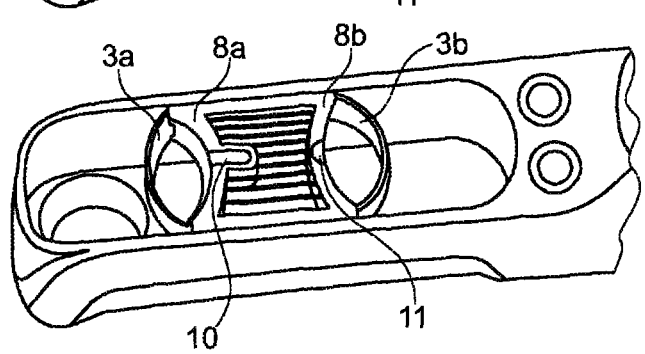
Fig. 4

ACCOMMODATION UNIT FOR STORAGE COMPARTMENT AND STORAGE COMPARTMENT

CROSS-REFERENCE TO RELATED APPLICATION

This application claims priority to German Patent Application No. 102008064460.9, filed Dec. 22, 2008, which is incorporated herein by reference in its entirety.

TECHNICAL FIELD

The invention relates to an accommodation unit for a storage compartment in a motor vehicle. The invention further relates to a storage compartment for the interior of a motor vehicle and also relates to a motor vehicle in.

BACKGROUND

A variety of storage compartments for motor vehicle interiors are known from the prior art, including for example glove compartments, side pockets in the vehicle doors, storage compartments in the centre consoles or under the seat armrests. Storage compartments of this kind are designed with compartment dividers that subdivide the storage compartment into smaller storage compartment units. These kinds of storage compartment divider are constructed rigidly and are able to be moved from a first storage position into a position for use as needed.

For example, German Patent No. DE 10 2005 017 565 B4 discloses a retaining device for an object equipped with a sliding arrangement having a sliding guide and an actuating element, and with a retaining element having a retaining means and at least one bracing element, wherein the retaining means and the at least one bracing element may serve to form an accommodation for the object, wherein one end section of the retaining means is attached in fixed manner to the bracing element, and the opposite end section of the retaining means is attached to the sliding guide so as to be displaceable along it via the actuating element, and wherein the retaining element is furnished with a bottom element for seating, which element is movable along the sliding guide together with the retaining means, the bottom element being constructed integrally with the band-shaped retaining means and attached in jointed manner to the retaining means via a film hinge.

One of the objects of the present invention is to create an accommodation unit for a storage compartment that enables accommodation spaces to be configured more flexibly. It is a further object of the present invention to provide a storage compartment for storing objects that may be adjusted optimally for fitting the objects to be stored and which is able to form restraining areas flexibly. Yet another object of the present invention is to provide a motor vehicle having a storage arrangement that may be adjusted optimally to objects that need to be stored. Furthermore, other objects, desirable features, and characteristics will become apparent from the subsequent summary and detailed description, and the appended claims, taken in conjunction with the accompanying drawings and this background.

SUMMARY

This and other objects are solved on the basis of an accommodation unit, a storage compartment, and a motor vehicle.

The embodiments of invention incorporate the technical teaching according to which in an accommodation unit for a motor vehicle storage compartment that includes a frame having a plurality of frame sections making up the frame, with which the frame may mounted so as to be movable in the storage compartment, the assembly is constructed such that in a space defined by the frame at least one retaining element of variable shape and connected to at least two frame sections is arranged to extend between the frame sections in the defined space, forming at least one restraining area. For the purposes of an embodiment of the invention, a restraining area is understood to mean an area delimited by at least one retaining element, by which an object is restrained at least during braking and/or acceleration. The frame is preferably of essentially two-dimensional construction, that is to say, its dimensions are substantially greater in two directions than in a third direction. In this context, the two dimensions correspond to a lengthwise and a widthwise direction of a storage compartment, and the third direction corresponds to the depth of a storage compartment, particularly such a compartment having an access opening aligned essentially horizontally. The frame may be mounted so as to be slidable, that is to say, the outer parts of the frame or of the longitudinally aligned frame sections are furnished with appropriate guidance means, for example for a ball, roller or slide bearing. The frame is essentially rectangular, so that essentially four frame sections are provided, forming the sides of the frame. The frame sections thus define a space that is surrounded by the frame sections. At least one retaining element with variable shape is provided in order to create restraining areas in the space that are flexibly adjustable to the shapes of different objects. The retaining element preferably has the form of an elastic retaining element or a slidable or deformable retaining element. Although the retaining element may be secured to one frame section, it is preferable to secure the retaining element to various frame sections. At the same time, the ends of the preferably band-like or strip-like retaining element are connected to the corresponding frame section. In this way, the retaining element extends through the defined space, thus dividing the space into at least two restraining areas. The restraining areas formed in this way are open in at least one and preferably two directions, that is to say, an access direction in which an object may be inserted into the restraining area. In one embodiment, a withdrawal opening is provided, from which the inserted object may protrude above the frame and into a storage space, for example. The restraining area formed by the frame thus surrounds a part of the object, so that the object is secured in the direction of the two principal directions of extension of the frame, and is unrestrained in the third (depth) direction.

In another embodiment of the present invention, several retaining elements are provided to form a plurality of restraining areas in a net arrangement. The retaining elements are constructed in a lattice, honeycomb or similar arrangement relative to each other, so that areas of the retaining elements overlap. In this context, the retaining elements may be arranged in a common plane, or at least some may be arranged in different planes. Connection points, with which the retaining elements are fixed to the frame sections, may be in the same plane or in different planes, that is to say, at approximately the same distance or at different distances in the depth direction.

A close-meshed arrangement is preferred, so that as many restraining areas as possible are formed. The strips may be disposed under tension or may hang loosely to form pocket-like restraining areas as well, which are delimited in a depth direction and open at the sides. The retaining elements may be attached to the frame sections via separate joints or integral joints, for example areas having the form of hinged joints.

In another embodiment of the present invention, it is provided that at least one retaining element is constructed so as to be slidable on at least one of the frame sections, so that it is able to form variable restraining areas. In this way, the distances between the retaining elements may be varied, for example in a lattice arrangement, so that they are able to optimally secure objects of different sizes. Preferably, multiple retaining elements are arranged, individually or in groups, so as to be movable, slidable or relocatable on the frame sections. Appropriate fixing means are provided to secure the retaining elements in position, and may be released and/or secured as necessary.

In a further embodiment of the present invention, it is provided that at least one of the frame sections is equipped with adjustment means so that the frame section and/or the frame may be altered spatially in one direction. The adjustment means may have the form of extending adjustment means, elastic adjustment means or similar for example, by which for example a frame section may be extended in one direction. The adjustment means may enable an adjustment in any direction or at any angle. In this way, the frame may also be guided along non-parallel rails. For larger objects, the frame may be enlarged, for example in a lengthwise, a widthwise or a depth direction.

In yet another embodiment of the present invention, it is provided that at least two retaining elements are at least partially connected to each other to form at least one restraining area having a pocket-like structure. In addition, several retaining elements may be connected to each other, to lend greater stability to a lattice structure, for example. The retaining elements may be connected to each other at any point, for example at the ends or in the area between the ends. The retaining elements may also be connected to the frame section for example via a common joint.

Yet another embodiment of the present invention provides that a frame section has a bistable retaining band, forming a further restraining area. The retaining band may project into the area defined by the frame sections or in another direction, for example in the opposite direction towards the outside. In this way, a further restraining area may be created outside of the defined space. The contour of the frame or frame sections may be designed in any way, for example as straight or at least partly curved fillets.

The embodiments of the invention further incorporate the technical teaching according to which, in a storage compartment for a motor vehicle interior having a housing that forms a storage space, an accommodation unit according to previously described and subsequently described embodiments, is provided in the storage compartment. The storage compartment is preferably in the shape of a pot or cup that is to say as a space that is open on one side. The housing is furnished with seating for the accommodation unit on at least one wall, and preferably on two separate walls. The accommodation unit preferably extends over a partial area of the storage space. In this way, the storage space may be subdivided into smaller restraining areas by the accommodation unit, thus enabling objects to be seated optimally.

In one embodiment of the present invention, it is provided that the housing has a guidance mechanism in which the accommodation unit is supported with at least one frame section, so that the accommodation unit may be moved through the storage space and still remain accessible while it is moving. The entire storage space may be closed with a cover, for example. When the cover is open, the accommodation unit may be accessed at all times, that is to say that access to the accommodation unit is not limited by a change in the accommodation unit's position. The guidance mechanism may include one or more guide rails. The accommodation unit may be slid or moved along the guidance mechanism. The guidance mechanism may be constructed such that at least sections thereof are not parallel and/or are on different planes than a base plane of the storage space. Here too, the accommodation unit may be slid or moved via the adjustment means.

In a further embodiment of the present invention, it is provided that the guidance mechanism is constructed as an essentially horizontal rail guide, along which the accommodation unit may be moved in the storage space. The guide rails are preferably constructed so as to run linearly, straight and/or non-linearly. The rails are preferably equidistant from each other and extend parallel to each other.

The embodiments of the invention also incorporate the technical teaching according to which, in a motor vehicle having at least one storage device in the interior thereof, the storage device is constructed in the form of a storage compartment according to the invention. Multiple storage compartments may be provided. The storage compartment may be designed, for example, as a storage compartment for the center arm console, a side door, a back seat, and a glove compartment or similar.

Further improvements to the embodiments of the invention are described in the subordinate claims or will be apparent from the following description of embodiments of the invention, which are shown diagrammatically in the drawing. In the drawing, identical or similar components or features are identified with the same reference sign. Features or components of different embodiments may be combined to create further embodiments. Thus, all features and/or advantages that are evident from the claims, the description or the drawing, including design details, spatial arrangement and process steps may thus be essential to the invention either on their own or in any and all combinations thereof.

BRIEF DESCRIPTION OF THE DRAWINGS

The present invention will hereinafter be described in conjunction with the following drawing figures, wherein like numerals denote like elements, and:

FIG. 1 is a diagrammatic perspective view of a storage compartment with an accommodation unit with two retaining bands in a first position;

FIG. 2 is a diagrammatic perspective view of the storage compartment of FIG. 1 with the retaining bands in a second position;

FIG. 3 is a diagrammatic perspective view of the storage compartment of FIG. 1 with a second embodiment of the accommodation unit with two retaining bands in a first position;

FIG. 4 is a diagrammatic perspective view of the storage compartment of FIG. 3 with the retaining bands in a second position;

DETAILED DESCRIPTION

Figure 5:
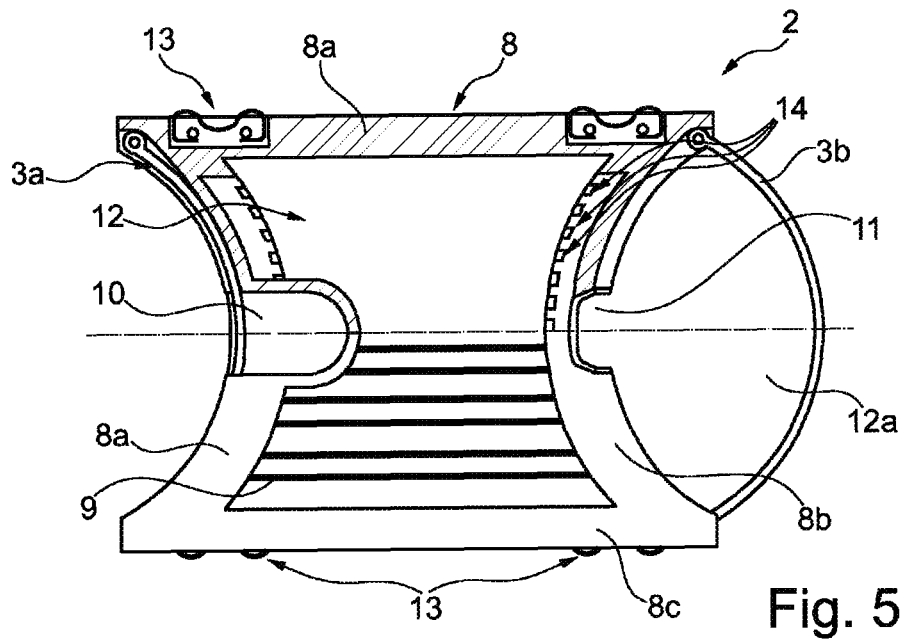
FIG. 5 is a diagrammatic plan view of a partial section of an accommodation unit according to FIG. 3.

The following detailed description is merely exemplary in nature and is not intended to limit application and uses. Furthermore, there is no intention to be bound by any theory presented in the preceding background or summary or the following detailed description.

FIG. 1 is a diagrammatic perspective view of a storage compartment 1 with an accommodation unit 2 having two retaining bands 3 in a first position. Storage compartment 1 is located in a centre console 4 of a motor vehicle (not shown here). Storage compartment 1 is delimited by a housing 5 that encloses a storage space 6. Storage space 6 is accessible from above. In order to subdivide storage space 6, and in particular to create smaller restraining areas for holding smaller objects, accommodation unit 2 is arranged in storage compartment 1. Appropriate seating 7, realized in the example shown as two guide rails 7a extending parallel with and at a distance from each other (only one of which is visible in the view according to FIG. 1) are provided on housing 5 to enable accommodation unit 2 to be inserted in housing 5. Accommodation unit 2 is seated on guide rails 7a so as to be movable accordingly. Accommodation unit 2 is constructed smaller than storage compartment 1 to allow it to be inserted movably in storage compartment 1, so that accommodation unit 2 may be moved in a lengthwise direction L in a range opposite an access opening in an upper area of housing 5, and is restricted in a width direction B. Accommodation unit 2 includes a frame 8 that is constructed with multiple frame sections 8a that form the frame. In the embodiment according to FIG. 1, two approximately straight frame sections 8a are associated with each lateral side, and two curved, particularly concave or convex frame sections 8a are associated with a longitudinal side. Frame 8 defines a space in which objects may be kept. For this purpose, retaining elements 9 having variable shapes are arranged on frame sections 8a in such manner that they protrude into the space. Retaining elements 9 are arranged in such manner that they are attached to two different frame sections 8a and divide the defined space. In the present embodiment, retaining elements 9 are arranged so as to be approximately equidistant and parallel in a lengthwise direction. Retaining elements 9 also lie approximately in the same plane. The retaining elements 9 themselves may be made for example from an elastic material such as rubber or similar. Retaining elements 9 may also be constructed so that their arrangement is variable, for example they may be moved closer together. Retaining bands 3 are arranged on a front side and a back side of frame 8, that is to say on the frame sections 8a associated with width direction B, and facing away from the defined space. Retaining bands 3 each have the form of a bistable band that lies snugly against the corresponding frame section 8a in a first position. In the second stable position, retaining bands 3 cooperate with the corresponding frame sections 8a to form a restraining area, in which objects may be kept, as is shown in greater detail in FIG. 2.

FIG. 2 is a diagrammatic perspective view of the storage compartment 1 of FIG. 1 with retaining bands 3 in a second position. The two retaining bands 3 are constructed as bistable retaining bands 3. In the embodiment shown in FIG. 2, frontally arranged retaining bands 3 are in the second stable position, in which they cooperate with the corresponding frame section 8a to form a storage compartment 6 or a restraining area for holding objects. The corresponding frame sections 8a with which retaining bands 3 are associated are convex or concave, with the result that the plan view reveals a roughly oval-shaped restraining area in which for example receptacles such as mugs and similar may be stowed. In order to create sufficient retention force, retaining bands 3 are preferably made from an elastic material so that they are able to hold a mug or some other object by clamping it against frame section 8a. Frame sections 8a may be adjusted correspondingly to hold for example cups or other objects with molded shapes, as is shown in FIGS. 3 and 4 for exemplary purposes.

FIG. 3 is a diagrammatic perspective view of the storage compartment 1 of FIG. 1 with another embodiment of an accommodation unit 2 with the two additional retaining bands 3 in a first position. In the first position, elastically constructed retaining bands 3 lie snugly against associated frame sections 8a and thus do not protrude to form a restraining area. The frame section 8a that is associated with a first retaining band 3a is furnished with a slot-like or groove-like recess 10. The frame section 8b, which is associated with second retaining band 3b is furnished with an approximately semi-cylindrical depression 11. Recess 10 serves for example to partially seat objects with molded shapes, while depression 11 serves for example to move retaining band 3 from a first stable position to a second stable position, as shown in FIG. 4.

FIG. 4 is a diagrammatic perspective view of the storage compartment 1 of FIG. 3 with retaining bands 3 in a second position. In the second position, first retaining band 3a together with the associated frame section 8a and the corresponding recess 10 forms a restraining area for a cup or other objects with corresponding molded shape. Second retaining band 3b cooperates with the associated frame section 8b to form a restraining area for example for a mug or other such object without a molded shape.

FIG. 5 is a diagrammatic plan view of a partial section of an accommodation unit 2 according to FIG. 3. Accommodation unit 2 has a frame 8 that is constructed from multiple frame sections 8a, 8b, 8c and thus defines a restraining area 12 formed between frame sections 8a. Frame sections 8a may have any configuration and shape. In the present example, the frontal sides of frame sections 8a are concave or convex, and a recess 10 and a depression 11 are provided. Guide elements 13 are provided on frame sections 8a on the longitudinal sides of frame 8, which enable frame 8 to be seated so as to be movable along a guide, for example of a storage compartment 1. In the example, four guide elements 13 are provided and have the form of sliding carriages. One retaining band 3, having the form of a bistable retaining band 3, particularly an elastic bistable band 3, is located on each frame section 8a that forms the frontal face. The first bistable retaining band 3a is shown in a first stable position, in which it lies essentially flush against the shape of the associated frame section 8a. Second bistable retaining band 3b is shown in a second stable position, in which it cooperates with the associated frame section 8b to form a second restraining area 12a, in which objects may be secured. Several retaining elements 9 extend from frame sections 8a, 8b, 8c, spanning restraining area 12. In the embodiment shown, retaining elements 9 extend parallel to lengthwise direction L. In this context, retaining elements 9 are constructed in the manner of elastic bands and extend in an upper area of the frame. Retaining elements 9 may be constructed individually, for example as a single band that is wound correspondingly around attachment members 14 and is secured at both ends.

Figure 6:
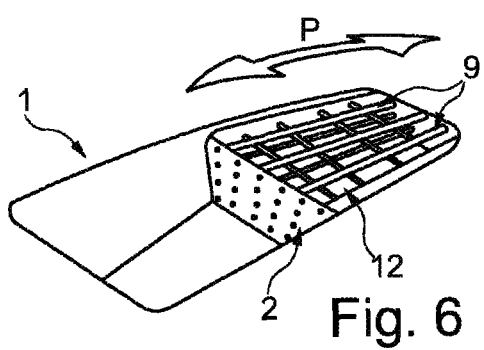
FIG. 6 is a diagrammatic perspective view of an accommodation unit having a lattice-like arrangement of retaining elements that is insertable into a storage compartment.

FIG. 6 is a diagrammatic perspective view of an accommodation unit 2 having a lattice-like arrangement of retaining elements 9 that is insertable into a storage compartment 1. Accommodation unit 2 is seated so as to be movable in the lengthwise direction indicated with arrow P. Retaining elements 9 are designed as elastic bands that form a three-dimensional lattice structure in several planes to create restraining areas 12.

Figure 7:
FIG. 7 is a diagrammatic perspective view of a section through a storage compartment with a movable accommodation unit.

FIG. 7 is a diagrammatic perspective view of a section through a storage compartment 1 with a movable accommodation unit 2.

Figures 8, 9:
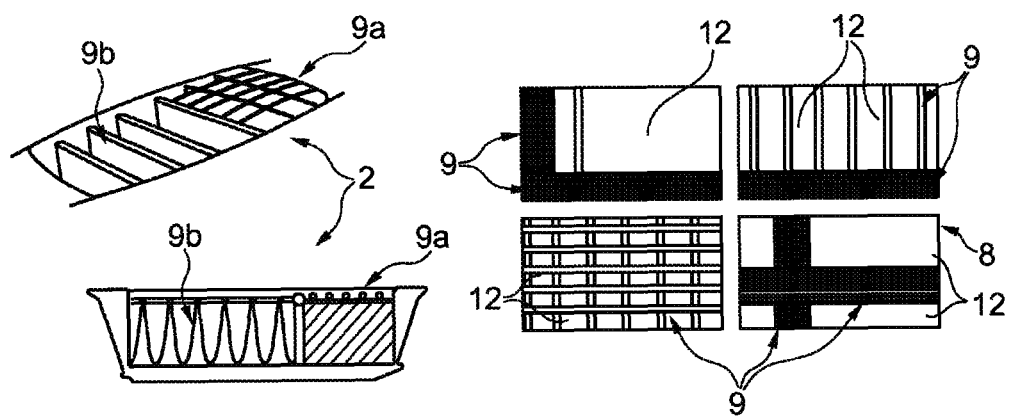
FIG. 8 is a diagrammatic plan view of various options for adjusting the retaining elements.
FIG. 9 is a diagrammatic perspective view and a sectional side view of an embodiment of an accommodation unit with band-like and pocket-like retaining elements.

FIG. 8 is a diagrammatic plan view of various options for adjusting retaining elements 9. Retaining elements 9 are arranged in a three-dimensional lattice structure. They may be pressed against the frame by securing retaining elements 9 correspondingly to create variable restraining areas 12.

FIG. 9 is a diagrammatic perspective view and a sectional side view of an embodiment of an accommodation unit 2 with band-like and pocket-like retaining elements 9. Band-like retaining elements 9a are arranged in a lattice-type network. Pocket-like retaining elements 9b hang loosely down into storage space 6 in the manner of loops and are open at the sides, as is shown in the cross section.

Figure 10:
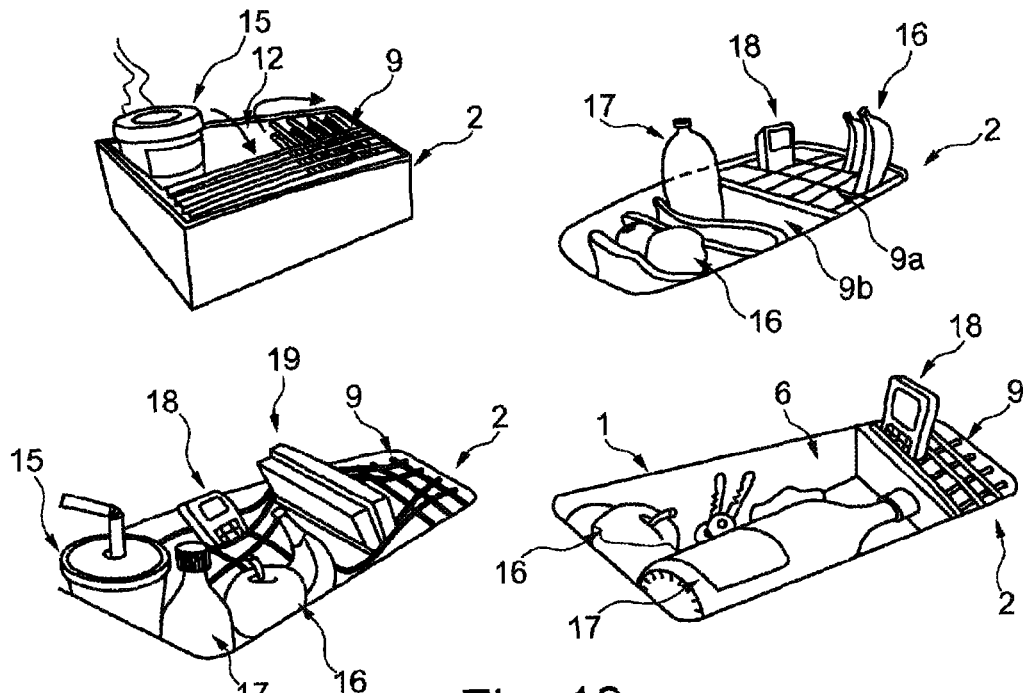
FIG. 10 is a diagrammatic perspective view of various embodiments of the accommodation unit and its applications.

FIG. 10 is a diagrammatic perspective view of various embodiments of accommodation unit 2 and its applications. For example, the three-dimensional lattice of retaining elements 9 may be adjusted at will to create restraining areas 12 specifically conformed to the objects that are to be retained, such as a beverage container 15. Retaining elements 9 may be configured variously, for example as first retaining elements 9a, which are constructed essentially in the form of bands, and as second retaining elements 9b, which are constructed approximately in the form of pockets. This enables suitable restraining areas 12 to be created for various objects such as fruit 16, bottles 17, and a mobile phone 18 and similar. Retaining elements 9 are preferably of elastic construction so that they are able to hold objects such as a wallet 19 or other such objects by clamping them. Accommodation unit 2 may be closed up or opened out, and the frame-shaped restraining areas 12 that are formed by retaining elements 9 still remain accessible. Thus for example, accommodation unit 2 may be arranged slidably in a storage compartment 1, such that storage space 6 may be filled in any manner and all of the objects stored therein are stowed securely. In the embodiments shown previously, the accommodation unit is located in centre consoles 4. Other implementation areas are shown in the following figure.

Figure 11:
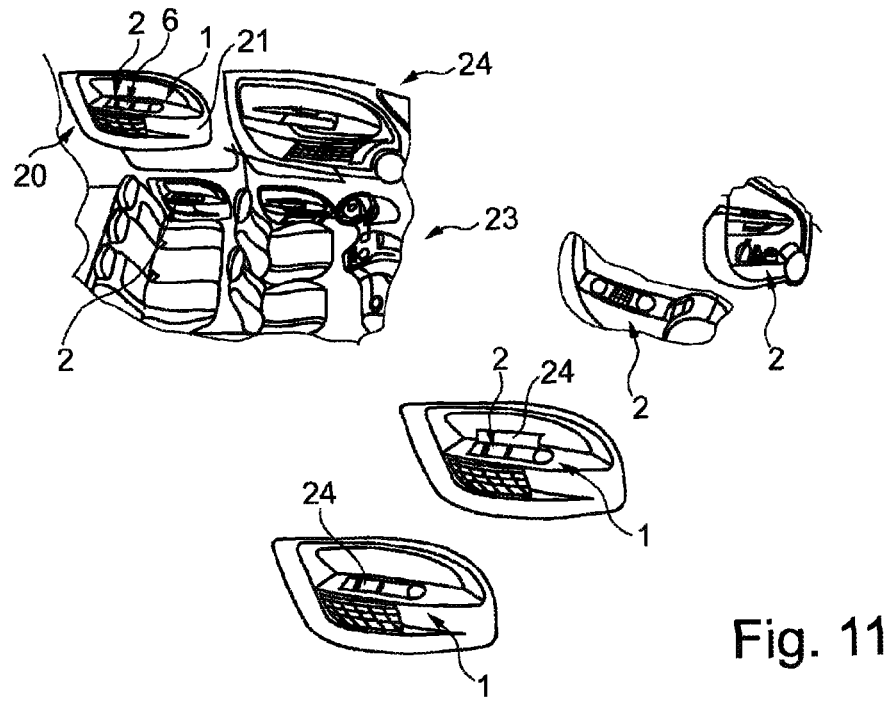
FIG. 11 shows several diagrammatic perspective views of various implementation options for the accommodation unit.

FIG. 11 shows several diagrammatic perspective views of various implementation options for accommodation unit 2. In the embodiment shown, accommodation unit 2 is arranged in a storage compartment 1 that is conformed in an armrest 20 in a side panel 21, for example in a side door 22 of a motor vehicle 23. Storage compartment 1 may be covered for example with a corresponding cover 24.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An accommodation unit for a storage compartment of a motor vehicle, comprising:
    a frame comprising a plurality of frame-forming sections that includes forward, rear, first side, and second side frame-forming sections, wherein the first side and second side frame-forming sections are coupled to the storage compartment such that the frame is supported movably in the storage compartment, wherein the forward, rear, first side, and second side frame-forming sections are coupled together at respective ends to form an interior area; and
    at least one retaining band with a variable shape positioned within the interior area of the frame and coupled to at least two of the frame-forming sections to form at least one first restraining area,
    wherein the at least one retaining band includes a first plurality of elastic retaining bands extending between the forward and rear frame-forming sections and a second plurality of elastic retaining bands extending between the first side and second side frame-forming sections to form the at least one first restraining area in a lattice configuration.

2. An accommodation unit as recited in claim 1, wherein the forward and rear frame-forming sections extend in a longitudinal direction and wherein the first side and second side frame-forming sections extend in a lateral direction, and
    wherein the at least one retaining band is constructed so as to be supported movably along the forward and rear frame-forming sections in the lateral direction or along the first side and second side frame-forming sections in the longitudinal direction such that the at least one first restraining area is variable.

3. An accommodation unit as recited in claim 1, wherein at least one frame-forming section of the plurality of frame-forming sections comprises an adjustment for adjusting the at least one frame-forming section spatially in one direction.

4. An accommodation unit as recited in claim 1, wherein at least one frame-forming section of the plurality of frame-forming sections comprises an adjustment for adjusting the frame spatially in one direction.

5. An accommodation unit as recited in claim 1, wherein the at least one retaining band includes at least two retaining bands at least partly connected to each other to create the at least one first restraining area having a pocket-like form.

6. An accommodation unit for a storage compartment of a motor vehicle, comprising:
    a frame comprising a plurality of frame-forming sections that includes forward, rear, first side, and second side frame-forming sections, wherein the first side and second side frame-forming sections are coupled to the storage compartment such that the frame is supported movably in the storage compartment, wherein the forward, rear, first side, and second side frame-forming sections are coupled together at respective ends to form an interior area and
    at least one retaining band with a variable shape positioned within the interior area of the frame and coupled to at least two of the frame-forming sections to form at least one first restraining area,
    wherein at least one of the forward frame-forming section or the rear frame-forming section has a bistable retaining band, the bistable retaining band having a concave shape in a stored state, generally flush against the at least one of the forward frame-forming section or the rear frame-forming section and the bistable retaining band having a convex shape in a deployed state, generally away from the at least one of the forward frame-forming section or the rear frame-forming section for forming an additional restraining area in the deployed state.

7. A storage compartment for a motor vehicle interior, comprising:
   a housing that forms a storage space; and
   an accommodation unit provided in the storage space, the accommodation unit comprising:
      a frame comprising a plurality of frame-forming sections that includes forward, rear, first side and second side frame-forming sections, wherein the first side and second side frame-forming sections are coupled to the storage compartment such that the frame is supported movably in the storage compartment, wherein the forward, rear, first side, and second side frame-forming sections are coupled together at respective ends to form an interior area; and
      at least one retaining band with a variable shape positioned within the interior area of the frame and coupled to at least two of the frame-forming sections to form at least one first restraining area
      wherein at least one frame-forming section of the plurality of frame-forming sections comprises an adjustment for adjusting the at least one frame-forming section spatially in one direction.

8. A storage compartment as recited in claim 7, wherein the housing comprises a guide in which the accommodation unit is supported with at least one of the plurality of frame-forming sections so that the accommodation unit can be moved along a length of the storage space, the accommodation unit is adapted to remain accessible while it is moving.

9. A storage compartment as recited in claim 8, wherein the guide is constructed as an essentially horizontally aligned rail guide along which the accommodation unit is movable in the storage space.

10. A storage compartment as recited in claim 7, wherein the at least one retaining band includes a plurality of elastic retaining bands extending between the forward and rear frame-forming sections and a second plurality of elastic retaining bands extending between the first side and second side frame-forming sections to form the at least one first restraining area in a lattice configuration.

11. A storage compartment as recited in claim 7, wherein the forward and rear frame-forming sections extend in a longitudinal direction and wherein the first side and second side frame-forming sections extend in a lateral direction, and wherein the at least one retaining band is constructed so as to be supported movably along the forward and rear frame-forming sections in the lateral direction or along the first side and second side frame-forming sections in the longitudinal direction such that the at least one first restraining area is variable.

12. A storage compartment as recited in claim 7, wherein the adjustment of the frame-forming section is configured to adjust the frame spatially in one direction.

13. A storage compartment as recited in claim 7, wherein the at least one retaining band includes at least two retaining bands at least partly connected to each other to create the at least one first restraining area having a pocket-like form.

14. A storage compartment as recited in claim 7, wherein at least one of the forward frame-forming section or the rear frame-forming section has a bistable retaining band, the bistable retaining band having a concave shape in a stored state, generally flush against the at least one of the forward frame-forming section or the rear frame-forming section and the bistable retaining band having a convex shape in a deployed state, generally away from the at least one of the forward frame-forming section or the rear frame-forming section for forming an additional restraining area in the deployed state.

15. A motor vehicle, comprising:
   an interior;
   a storage device provided in the interior, wherein the storage device is constructed as a storage compartment, the storage compartment comprising:
      a housing that forms a storage space; and
      an accommodation unit provided in the storage space, the accommodation unit comprising:
         a frame comprising a plurality of frame-forming sections that includes forward, rear, first side and second side frame-forming sections, wherein the first side and second side frame-forming sections are coupled to the storage compartment such that the frame is able to be supported movably in the storage compartment, wherein the forward, rear, first side, and second side frame-forming sections are coupled together at respective ends to form an interior area; and
         at least one retaining band with a variable shape positioned within the interior area of the frame and coupled to at least two of the frame-forming sections to form at least one first restraining area,
      wherein the housing comprises a guide in which the accommodation unit is supported with at least one frame-forming section so that the accommodation unit can be moved along a length of the storage space, the accommodation unit is adapted to remain accessible while it is moving.

16. A motor vehicle as recited in claim 15, wherein the guide is constructed as an essentially horizontally aligned rail guide along which the accommodation unit is movable in the storage space.

17. A motor vehicle as recited in claim 15, wherein the at least one retaining band includes a first plurality of elastic retaining bands extending between the forward and rear frame-forming sections and a second plurality of elastic retaining bands extending between the first side and second side frame-forming sections to form the at least one first restraining area in a lattice configuration.

* * * * *